United States Patent
Kojima

(10) Patent No.: US 9,489,583 B2
(45) Date of Patent: Nov. 8, 2016

(54) ROAD SURFACE SHAPE ESTIMATING DEVICE

(71) Applicant: DENSO CORPORATION, Kariya, Aichi-pref (JP)

(72) Inventor: Shinya Kojima, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 43 days.

(21) Appl. No.: 14/108,898

(22) Filed: Dec. 17, 2013

(65) Prior Publication Data

US 2014/0180497 A1   Jun. 26, 2014

(30) Foreign Application Priority Data

Dec. 20, 2012 (JP) .................................. 2012-278269
Jun. 18, 2013 (JP) .................................. 2013-127747

(51) Int. Cl.
*G05D 1/00* (2006.01)
*G06K 9/00* (2006.01)

(52) U.S. Cl.
CPC ................................ *G06K 9/00798* (2013.01)

(58) Field of Classification Search
CPC ... B60T 8/172; G07C 5/008; B60R 16/0231; B60R 16/0315; B60G 17/0195
See application file for complete search history.

(56) References Cited

U.S. PATENT DOCUMENTS

| 5,410,346 A * | 4/1995 | Saneyoshi | B60R 1/00 348/116 |
| 6,053,268 A * | 4/2000 | Yamada | B60T 7/22 180/167 |
| 6,590,521 B1 * | 7/2003 | Saka | G01S 13/931 180/167 |
| 2002/0080019 A1 * | 6/2002 | Satoh | G06K 9/00798 340/436 |
| 2002/0154217 A1 * | 10/2002 | Ikeda | G01S 11/12 348/148 |
| 2003/0001732 A1 * | 1/2003 | Furusho | G05D 1/0246 340/435 |
| 2005/0063565 A1 * | 3/2005 | Nagaoka | B60R 21/013 382/104 |
| 2005/0086000 A1 * | 4/2005 | Tsuchiya | G08G 1/166 701/538 |
| 2005/0209749 A1 * | 9/2005 | Ito et al. | B60R 1/00 701/36 |
| 2006/0015242 A1 * | 1/2006 | Yoshida | G08G 1/161 701/96 |
| 2006/0125679 A1 * | 6/2006 | Horibe | G01S 17/023 342/52 |
| 2006/0239509 A1 * | 10/2006 | Saito | G06K 9/6205 382/104 |

(Continued)

FOREIGN PATENT DOCUMENTS

JP   08-005388   1/1996
JP   H11-203458   7/1999

(Continued)

OTHER PUBLICATIONS

Office Action dated Feb. 17, 2015 issued in the corresponding JP application No. 2013-127747.

*Primary Examiner* — Ian Jen
(74) *Attorney, Agent, or Firm* — Harness, Dickey & Pierce, P.L.C.

(57) ABSTRACT

A road surface shape estimating device includes a target detecting unit, a coordinate calculating unit and an estimating unit. The target detecting unit detects a known target from a captured image capturing an area ahead of a vehicle. The known target is a target of which a size and positional relationship to a road surface is known. The coordinate calculating unit determines three-dimensional coordinates for each known target from a size and position in the captured image of the known target detected by the target detecting unit. The estimating unit estimates a road surface shape using the three-dimensional coordinates calculated by the coordinate calculating unit.

20 Claims, 7 Drawing Sheets

(56) References Cited

U.S. PATENT DOCUMENTS

| | | | |
|---|---|---|---|
| 2007/0069872 A1* | 3/2007 | Arakawa | B62D 15/029 340/435 |
| 2008/0031514 A1 | 2/2008 | Kakinami | |
| 2008/0061950 A1* | 3/2008 | Kawasaki | G06K 9/00798 340/425.5 |
| 2008/0110556 A1* | 5/2008 | Kawasaki | B60W 40/072 156/238 |
| 2008/0169912 A1* | 7/2008 | Kawasaki | G06K 9/00825 340/425.5 |
| 2008/0204208 A1* | 8/2008 | Kawamata | B60R 1/00 340/435 |
| 2009/0041303 A1* | 2/2009 | Aoki | G06K 9/00798 382/104 |
| 2009/0041337 A1* | 2/2009 | Nakano | G06K 9/00798 382/154 |
| 2009/0132161 A1* | 5/2009 | Akita | G01C 21/3647 701/532 |
| 2009/0195410 A1* | 8/2009 | Takemura | G06T 7/2033 340/904 |
| 2009/0231146 A1* | 9/2009 | Fujita | G01C 21/3461 340/576 |
| 2009/0284597 A1* | 11/2009 | Nakamori | G06K 9/00798 348/148 |
| 2009/0303077 A1* | 12/2009 | Onome | G08G 1/096716 340/901 |
| 2010/0033571 A1* | 2/2010 | Fujita | B60W 40/02 348/149 |
| 2010/0104137 A1* | 4/2010 | Zhang | G06K 9/00805 382/104 |
| 2010/0110193 A1* | 5/2010 | Kobayashi | G06K 9/00805 348/149 |
| 2010/0253540 A1* | 10/2010 | Seder | B60R 1/00 340/905 |
| 2010/0253543 A1* | 10/2010 | Szczerba | B60Q 9/005 340/932.2 |
| 2010/0253593 A1* | 10/2010 | Seder | G01S 13/723 345/7 |
| 2010/0253595 A1* | 10/2010 | Szczerba | G01C 21/365 345/7 |
| 2010/0253596 A1* | 10/2010 | Szczerba | G01S 13/723 345/7 |
| 2010/0299109 A1* | 11/2010 | Saito | B60W 40/072 703/1 |
| 2011/0222732 A1 | 9/2011 | Higuchi et al. | |
| 2011/0238252 A1* | 9/2011 | Takeda | B60W 40/072 701/31.4 |
| 2011/0261168 A1* | 10/2011 | Shima | B60T 7/22 348/47 |
| 2012/0002057 A1 | 1/2012 | Kakinami | |
| 2012/0075878 A1* | 3/2012 | Sato | B60R 1/00 362/538 |
| 2012/0140039 A1* | 6/2012 | Ota | B60W 30/12 348/46 |
| 2012/0224060 A1* | 9/2012 | Gurevich | B60R 1/00 348/148 |
| 2012/0242505 A1* | 9/2012 | Maeda | G08G 1/164 340/905 |
| 2012/0242799 A1* | 9/2012 | Saito | G01S 7/4802 348/46 |

FOREIGN PATENT DOCUMENTS

| | | |
|---|---|---|
| JP | 2006-148745 | 6/2006 |
| JP | 2010-072973 | 4/2010 |
| JP | 2010-232852 | 10/2010 |

* cited by examiner

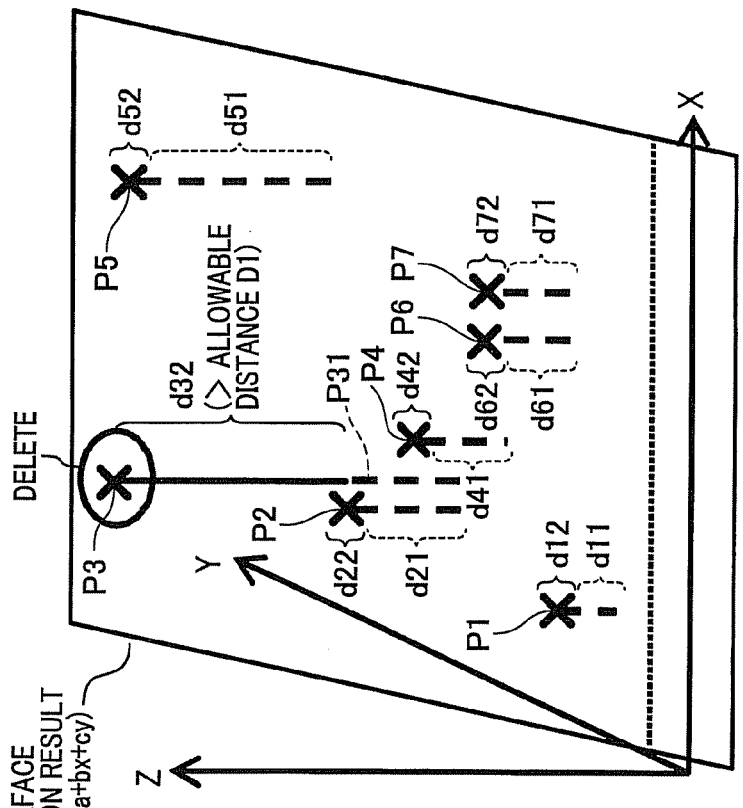
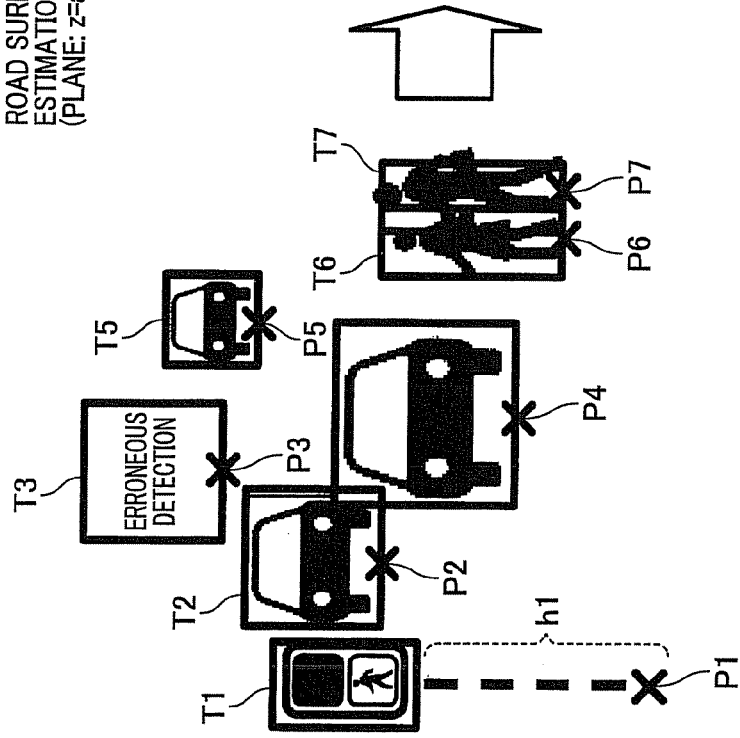

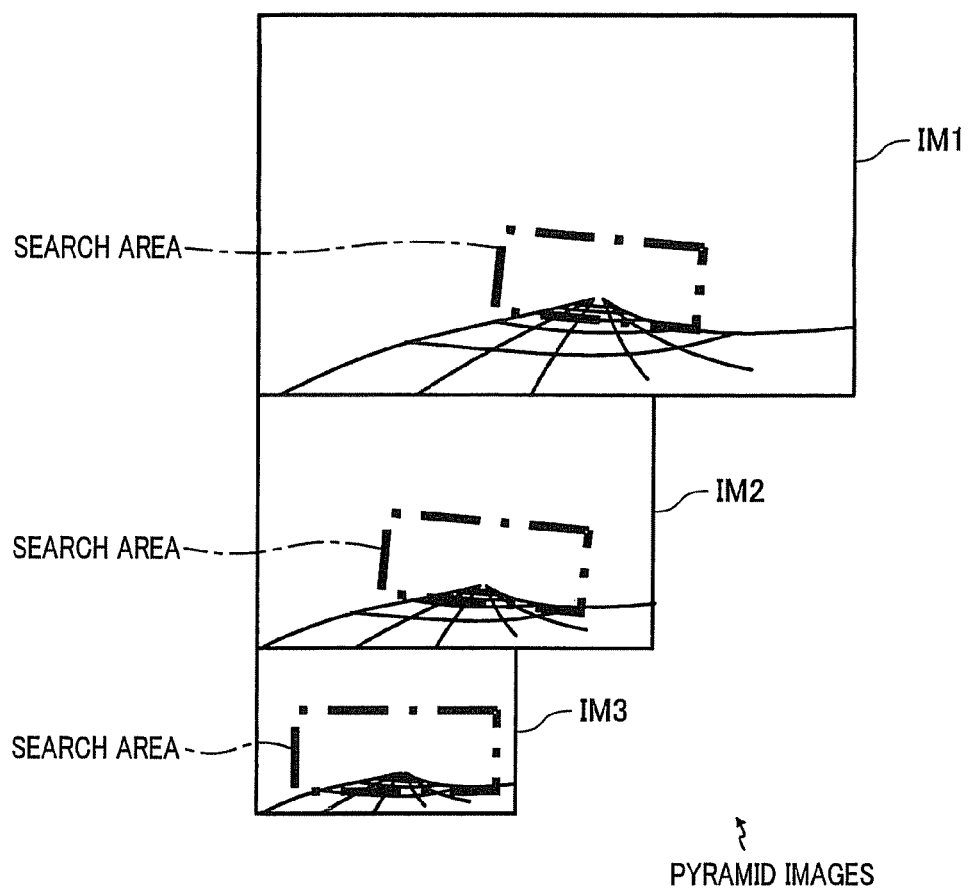

ROAD SURFACE SHAPE ESTIMATING DEVICE

CROSS-REFERENCE TO RELATED APPLICATION

This application is based on and claims the benefit of priority from Japanese Patent Applications No. 2012-278269 filed on Dec. 20, 2012 and No. 2013-127747 filed on Jun. 18, 2013, the descriptions of which are incorporated herein by reference.

BACKGROUND

1. Technical Field

The present invention relates to a road surface shape estimating device that estimates a road surface shape from a captured image.

2. Related Art

In recent years, there has been active research and development in measures for ensuring safe cruising of vehicles traveling on roads. In this field, it is important to acquire various pieces of information from an image captured by an on-board camera. The various pieces of information relate to a target that appears in the captured image (such as distance to the target and the size of the target). To acquire the various pieces of information, a three-dimensional shape of the road (referred to, hereinafter, as a "road surface shape" or "road surface profile") is required to be known.

Conventionally, a device is known that detects, from a captured image, lane markers that are drawn on the road surface. The device then estimates the road surface shape based on positional information of the lane markers (refer to, for example, JP-A-H08-5388).

However, the above-described conventional device cannot estimate the road surface shape for a road that has no road markings such as lane markers. Therefore, a problem occurs in that the accuracy of target detection decreases.

SUMMARY

It is thus desired to provide a road surface shape estimating device that is capable of estimating a road surface shape regardless of whether or not road markings are present.

An exemplary embodiment provides a road surface shape estimating device includes target detecting means, coordinate calculating means, and estimating means. The target detecting means detects at least a known target from a captured image capturing an area ahead of a vehicle. The known target is a target of which a size and positional relationship to a road surface is known. The coordinate calculating means determines three-dimensional coordinates for each known target from a size and position in the captured image of the known target detected by the target detecting means. The estimating means estimates a road surface shape using the three-dimensional coordinates calculated by the coordinate calculating means.

The target of which the positional relationship to the road surface is known may include targets that are present in a state of contact with the road surface, such as vehicles and pedestrians. The target may also include targets set at a prescribed height from the road surface, such as traffic lights.

In other words, if the size and position of the known target in the captured image are known, the position (three-dimensional coordinates) of the known target in actual space can be estimated from the actual size of the known target and the parameters of the imaging device (camera) that are known information. Furthermore, the position of the road surface (three-dimensional coordinates) can be estimated by taking into consideration the positional relationship between the known target and the road surface that is known information. As a result, a number of three-dimensional coordinates indicating the position of the road surface that amounts to the number of detected known targets can be obtained. Therefore, the road surface shape can be estimated from the three-dimensional coordinates.

As described above, the road surface shape estimating device of the exemplary embodiment can estimate the road surface shape even for a road that has no road markings, such as lane markers. As a result, during target detection by image recognition, erroneous detections and detection omissions attributed to inaccurate understanding of the road surface shape can be reduced.

In addition, in the road surface shape estimating device of the exemplary embodiment, the target detection results are used. A special process solely for determining the road surface shape is not required to be performed. Therefore, the amount of calculation required for estimating the road surface shape can be reduced.

BRIEF DESCRIPTION OF DRAWINGS

In the accompanying drawings:

FIG. 6A is an explanatory diagram related to a candidate known target, and FIG. 6B is an explanatory diagram of a relationship between the candidate known target and an estimated road surface; and FIG. 7 is an explanatory diagram of an example of a search area set when a road surface is estimated to be a curved surface.

DESCRIPTION OF EMBODIMENTS

An embodiment of the present invention will hereinafter be described with reference to the drawings.

Figure 1:
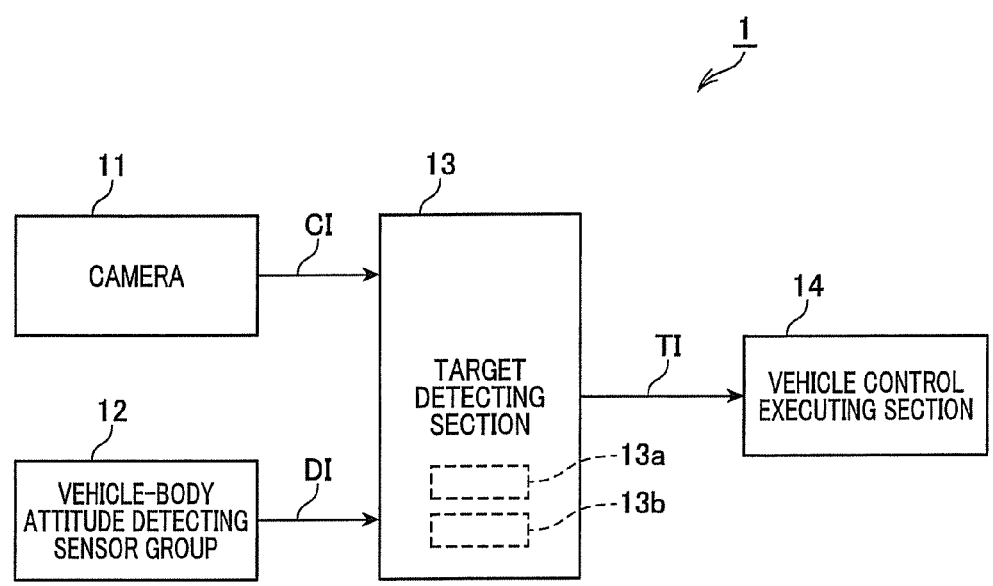
FIG. 1 is a block diagram of a configuration of a vehicle control system using a road surface shape estimating device according to an embodiment.

A vehicle control system 1 using a road surface shape estimating device according to the present embodiment shown in FIG. 1 is mounted in a vehicle. The vehicle control system 1 includes a camera 11, a vehicle-body attitude detecting sensor group 12, a target detecting section 13 to which the road surface shape estimating device is applied, and a vehicle control executing section 14. In the vehicle control system 1, the target detecting section 13 can communicate with the camera 11, the vehicle-body attitude detecting sensor group 12, and the target detecting section 13. A means for actualizing communication among the constituent elements of the vehicle control system 1 is not particularly limited.

The camera 11 is attached to an own vehicle (the vehicle in which the vehicle control system 1 is mounted). The camera 11 captures an image of an area ahead of the own vehicle, from the center of the front side of the own vehicle. The camera 11 transmits image data (the captured image of the area ahead of the own vehicle) to the target detecting section 13.

The vehicle-body attitude detecting sensor group 12 is composed of various sensors used to detect a pitch angle, a roll angle, and a yaw angle of the own vehicle. The vehicle-body attitude detecting sensor group 12 transmits detection information DI to the target detecting section 13.

The target detecting section 13 is an electronic control unit that generates target information used for vehicle control. The target detecting section 13 includes a central processing unit (CPU) 13a and a storage section 13b including a read-only memory (ROM) and a random access memory (RAM). The target detecting section 13 performs a target detecting process, described hereafter.

The vehicle control executing section 14 is an electronic control unit that controls the behavior and the like of the own vehicle. The vehicle control executing section 14 includes a CPU, a ROM, a RAM, and the like. The vehicle control executing section 14 performs vehicle control based on the target information acquired from the target detecting section 13. Specifically, the vehicle control executing section 14 performs control operations such as warning control, collision avoidance control, and automatic cruise control. These control operations are well-known. Therefore, detailed description thereof is omitted.

(Target Detecting Process)

Next, a target detecting process performed by the target detecting section 13 will be described.

Figure 2:
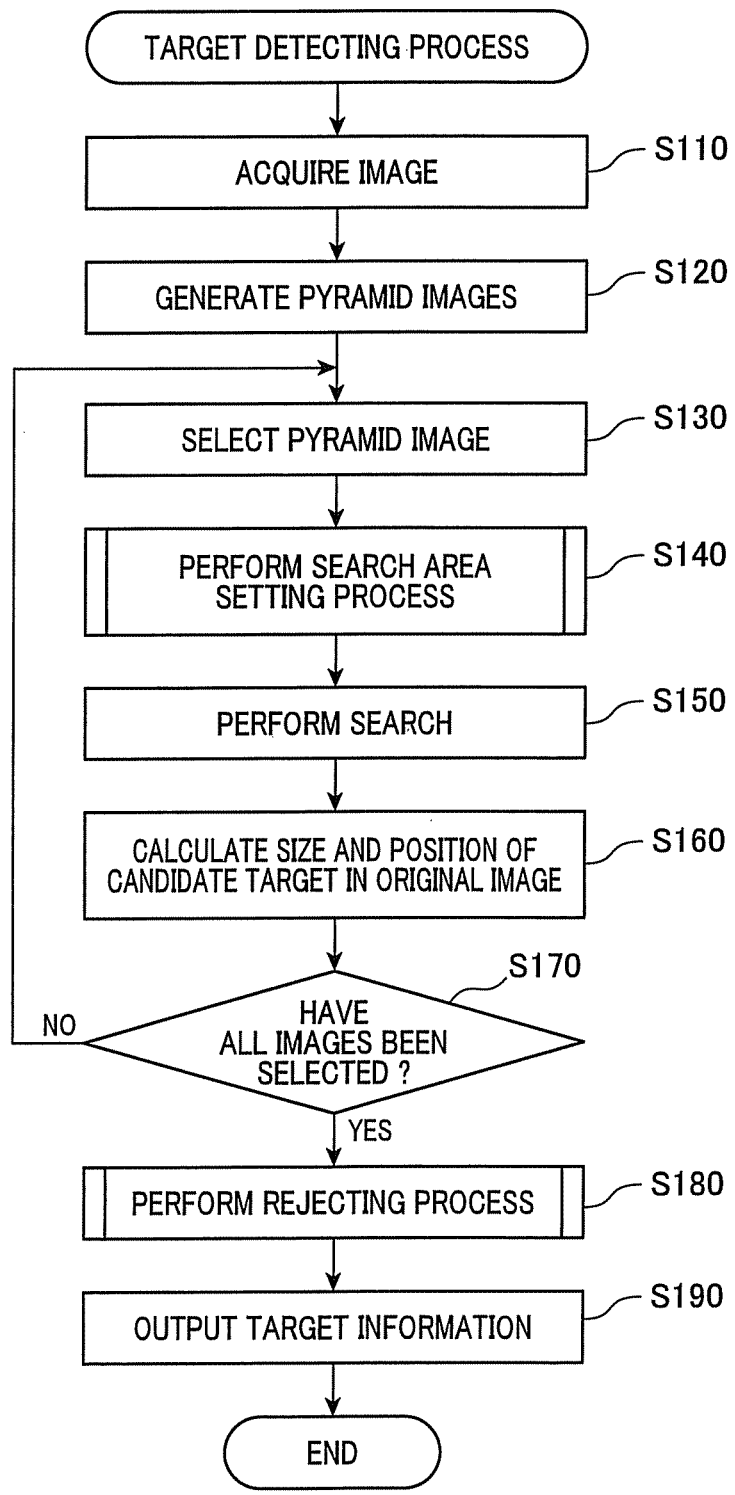
FIG. 2 is a flowchart of a target detecting process.

The storage section (such as the ROM) 13b included in the target detecting section 13 stores therein a target detecting program. The target detecting program is used to actualize the target detecting process. Hereafter, the target detecting process will be described with reference to the flowchart in FIG. 2. The target detecting process is performed by the target detecting section 13 (specifically the CPU 13a) in adherence to the target detecting program. The target detecting process shown in FIG. 2 is repeatedly performed at a predetermined cycle while the own vehicle is traveling.

At step S110, the target detecting section 13 first acquires image data (a captured image of the area ahead of the own vehicle) CI from the camera 11.

Next, at step S120, the target detecting section 13 generates pyramid images based on the captured image data CI acquired at step S110 (referred to, hereinafter, as an "original image"). The pyramid images refer to an image group formed of a plurality of images generated by enlarging and reducing the original image. When a target is detected by template matching, the pyramid image enables detection of subject targets that are subject to detection. The subject targets are present at various distances in the original image. The subject targets are detected using a template of the subject target in a single size.

Next, at step S130, the target detecting section 13 selects a single pyramid image generated at step S120. The target detecting section 13 then performs a search area setting process at step S140. In the search area setting process, the target detecting section 13 sets a search area for the target in the pyramid image that has been selected (referred to, hereinafter, as a "selected image").

Figure 3:
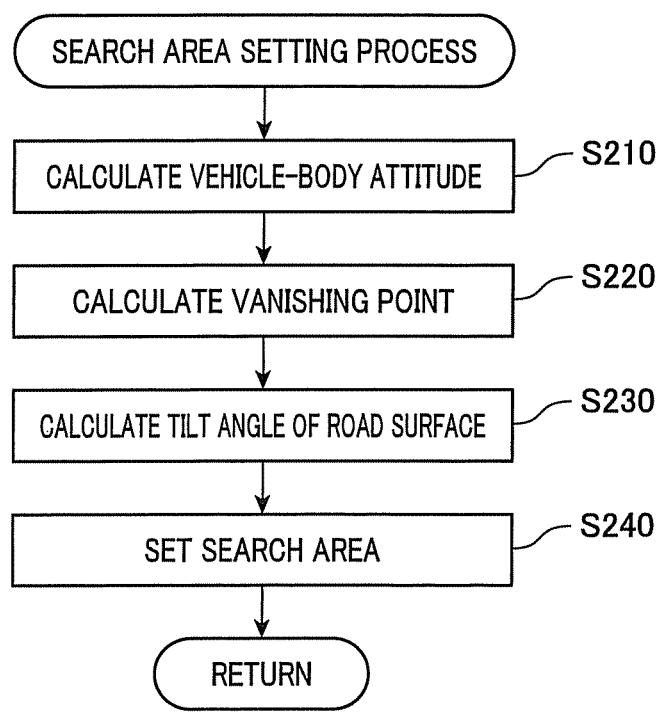
FIG. 3 is a flowchart of a search area setting process.

Here, details of the search area setting process will be described with reference to the flowchart in FIG. 3.

The target detecting section 13 first acquires detection results DI from the vehicle-body attitude detecting sensor group 12. Based on the acquired detection results DI, the target detecting section 13 then determines the vehicle-body attitude (pitch angle, roll angle, and yaw angle) of the own vehicle at step S210.

Next, at step S220, the target detecting section 13 calculates the position of a vanishing point in the selected image from the vehicle-body attitude determined at step S210. For example, the position of the vanishing point may be determined by performing image processing on the original image and detecting optical flow.

Then, at step S230, the target detecting section 13 calculates a tilt angle of the road surface from a road surface shape estimated by a rejecting process performed at step S180, described hereafter.

Next, at step S240, the target detecting section 13 sets the search area for the target in the selected image, based on the position of the vanishing point determined at step S220, the tilt angle of the road surface determined at step S230, and the enlargement/reduction scale factor of the selected image selected at step S120. The target detecting section 13 then ends the search area setting process.

Figure 4:
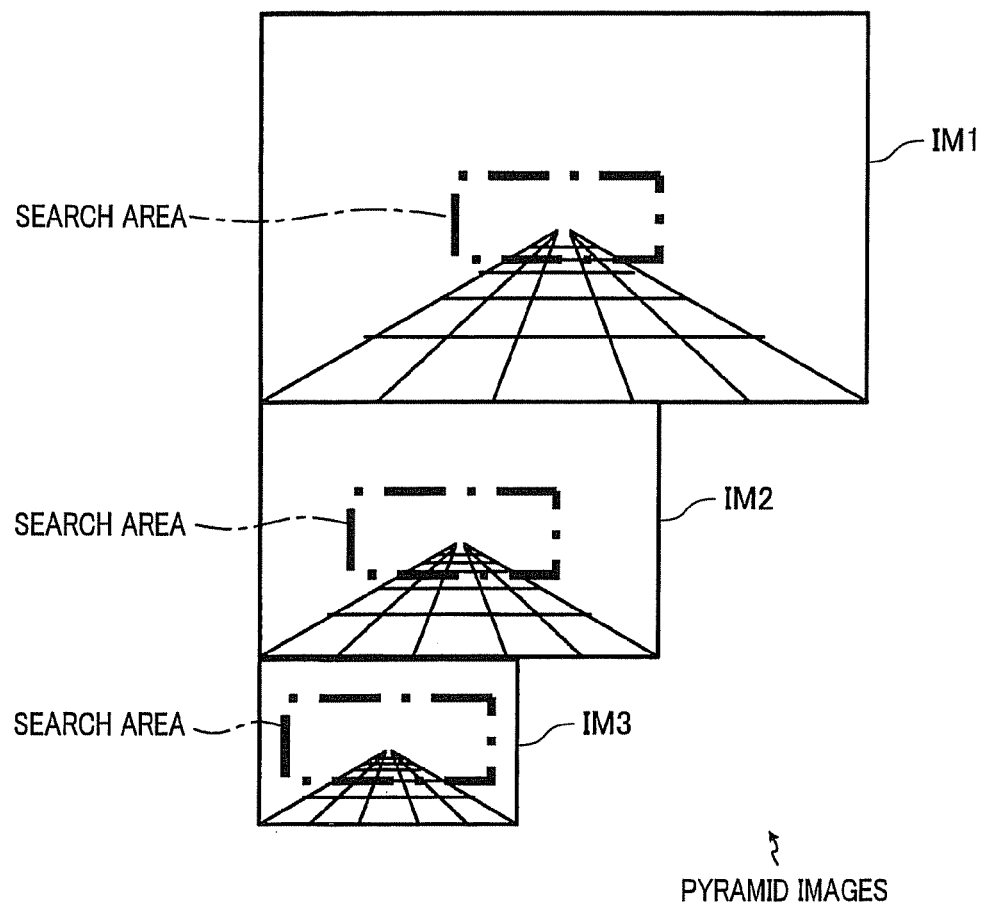
FIG. 4 is an explanatory diagram of an example of pyramid images and a search area.

In other words, the distance to a subject target in an actual space when the size of the subject target in the selected image matches the size of the template differs for each scale factor of the selected image. Therefore, as shown in FIG. 4, based on the enlargement/reduction scale factor of the selected image (the images IM1 to IM3 forming the image group of the pyramid images), an area of the selected image in which detection of a subject target in the size of the template is highly likely is set as the search area. However, a search area such as this changes depending on the position of the vanishing point and the tilt angle of the road surface.

Therefore, the search area is set taking into consideration the position of the vanishing point and the tilt angle of the road surface. Specifically, when the position of the vanishing point is positioned further on the upper side in the selected image, the setting position of the search area is also required to be set further on the upper side. In addition, when the road surface is an uphill slope, the setting position of the search area is required to be set further on the upper side of a screen as the tilt becomes steeper. When the road surface is a downhill slope, the setting position of the search area is required to be set further on the lower side of the screen as the tilt becomes steeper.

Returning to FIG. 2, at step S150, the target detecting section 13 performs searching for the subject targets in the selected image selected at step S130. The target detecting section 13 performs the search by template matching in the search area set at step S140.

The subject targets include at least a known target. The known target is a target of which the size and positional relationship with the road surface in actual space is known. The known target includes targets that are present in a state of contact with the road surface, such as vehicles and pedestrians. The known target also includes targets set at a prescribed height from the road surface, such as traffic lights. Here, the shape of the template is a rectangle.

Next, at step S160, the target detecting section 13 sets rectangular areas extracted by the search performed at step S150 as candidate areas, and calculates the sizes and positions of all candidate areas in the original image. This calculation is actualized by a simple operation, such as multiplication by an inverse number of the scale factor of the selected image.

Next, at step S170, the target detecting section 13 judges whether or not all images configuring the pyramid images generated at step S120 have been selected at step S130. When judged that an image has not been selected (NO in step S170), the target detecting section 13 returns to step S130 and repeats the above-described processing operations at steps S130 to S160. In the other hand, when judged that all images have been selected (YES in step S170), the target detecting section 13 performs the rejecting process (described hereafter) at step S180. In the rejecting process, the target detecting section 13 deletes candidate areas presumed to be erroneous detections from the extracted candidate areas.

Next, at step S190, the target detecting section 13 sets the remaining candidate area that has not been deleted at step S180 as a detected target. The target detecting section 13 generates target information TI that is information related to the detected target (such as the type, size, three-dimensional position, and relative velocity of the target). The target detecting section 13 then transmits the target information TI to the vehicle control executing section 14. The vehicle control executing section 14 performs various vehicle control operations according to the target information TI. The target detecting section 13 then ends the target detecting process.

Figure 5:
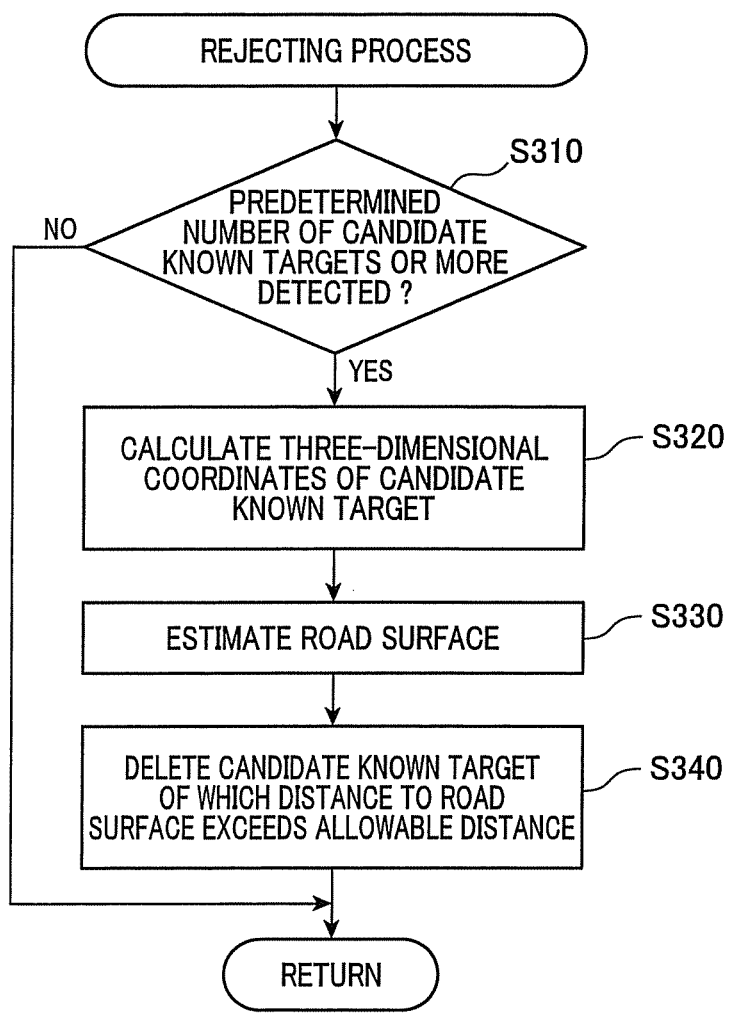
FIG. 5 is a flowchart of a rejecting process.

Next, the rejecting process performed at step S180 will be described with reference to the flowchart in FIG. 5.

First, at step S310, the target detecting section 13 judges whether or not a predetermined number (such as five) of candidate known targets or more has been detected. The candidate known target is a candidate target that has been detected by search using a template of a known target. When judged that the number of candidate known targets does not meet the predetermined number (NO in step S310), the target detecting section 13 skips the following processing operations and ends the rejecting process.

On the other hand, when judged that the predetermined number of candidate known targets or more has been detected (YES in step S310), the target detecting section 13 calculates three-dimensional coordinates (coordinates in actual space) of each candidate known target at step S320.

Specifically, the target detecting section 13 determines the three-dimensional coordinates in the following manner. In other words, as the position of the candidate known target, as shown in FIG. 6A, regarding a candidate known target that has been detected using a template of a known target present in a state of contact with the road surface (e.g., the templates T2 to T7 in FIG. 6A), the target detecting section 13 uses a center position (e.g., the positions P2 to P7 expressed by x in FIG. 6A) on the lower end of the detected area as the position of the candidate known target. In addition, regarding a candidate known target that has been detected using a template of a known target present at a predetermined height from the road surface (e.g., the template T1 in FIG. 6A), the target detecting section 13 uses a position (e.g., the position P1 expressed by x in FIG. 6A) that is below the center position on the lower end of the detected area by an amount amounting to the predetermined height (e.g., the height h1 in FIG. 6A). Hereafter, the position that is used is referred to as a ground position.

Then, when an offset of the ground position of an i-th candidate known target from the image center in the original image is ($p_i$, $q_i$), and a lateral width of the rectangular area (template) is $w_i$, the three-dimensional coordinates of the candidate known target ($x_i$, $y_i$, $z_i$) is determined by the following expression (1).

$$(x_i, y_i, z_i) = \left(\frac{p_i y_i}{C}, C\frac{W}{w_i}, \frac{q_i y_i}{D}\right) \quad (1)$$

In the expression (1), W represents an actual lateral width of the candidate known target that is known information, C represents a value obtained by a focal distance of the camera 11 being divided by one-pixel width of the image, and D represents a value obtained by the focal distance of the camera 11 being divided by one-pixel height of the image.

Next, at step S330, the target detecting section 13 estimates the road surface shape from the three-dimensional coordinates determined for each candidate known target at step S320. Here, the target detecting section 13 estimates the road surface shape using a known linear regression method (such as the least squares method or ridge regression), with the road surface being considered to be a plane (flat surface) (see FIG. 6B).

For example, when the least squares method is used, parameters (a, b, c) that correspond to the coefficients of the equation of the plane expressed in the following expression (2) indicating the road surface shape can be determined using the following expression (3).

$$z = a + bx + cy \quad (2)$$

$$(a, b, c)^T = (X^T X)^{-1} X^T Z \quad (3)$$

where $$X = \begin{bmatrix} 1 & x_1 & y_1 \\ \vdots & \vdots & \vdots \\ 1 & x_n & y_n \end{bmatrix}$$

$$Z = (z_1, \ldots, z_n)^T$$

In the expression (3), $(a, b, c)^T$ denotes a 3×1 transposed matrix that is the obtained by the transpose of a 1×3 matrix [a b c], where a, b and c are parameters of the expression (2). X denotes an n×3 matrix, where n is the number of the candidate known targets. $X^T$ denotes a 3×n transposed matrix that is obtained by the transpose of the n×3 matrix X. $(X^T X)^{-1}$ denotes a 3×3 inverse matrix of a 3×3 matrix $(X^T X)$. Z denotes an n×1 matrix. ($x_1$, $y_1$, $z_1$) to ($x_n$, $y_n$, $z_n$) denotes three-dimensional coordinates of 1st to n-th candidate known targets. $(z_1, \ldots, z_n)^T$ denotes an n×1 transposed matrix that is obtained by the transpose of a 1×n matrix [$z_1 \ldots z_n$].

In FIG. 6B, x represents the position of the candidate known target (e.g., the positions P1, P2, P3, P4, P5, P6 and P7). In each of the positions P1 to P7, a dotted line shown below x represents a distance from an XY plane to the estimated road surface (e.g., the distances d11, d21, d31, d41, d52, d61 and d71 in FIG. 6B), and a solid line show below x represents a distance from the estimated road surface to the candidate known target (e.g., the distances d12, d22, d32, d42, d52, d62 and d72 in FIG. 6B).

Next, at step S340, the target detecting section 13 deletes a candidate known target of which the distance from the estimated road surface at step S330 exceeds a predetermined allowable distance D1. In the example of FIG. 6B, the candidate known target having the position P3 is deleted, because the distance d32 exceeds the allowable distance. The target detecting section 13 considers the candidate known target such as this to have been detected by erroneous detection. The target detecting section 13 then ends the rejecting process.

In the present embodiment, the target detecting section 13 performing steps S110 to S150 corresponds to the target detecting means or unit. The target detecting section 13 performing steps S320 corresponds to the coordinate calculating means or unit. The target detecting section 13 performing steps S330 corresponds to the estimating means or unit. The target detecting section 13 performing steps S340 corresponds to the deleting means or unit. The target detecting section 13 performing steps S140 corresponds to the search area setting means or unit.

According to the embodiment described in detail above, the following effects can be achieved.

(i) The target detecting section 13 determines positional coordinates in actual space (three-dimensional coordinate system) using the size and position of the known target in the selected image. The known target is a target of which the size and positional relationship to the road surface is known. The target detecting section 13 then estimates the road surface shape from the determined positional coordinates.

Therefore, according to the present embodiment, the road surface shape can be estimated even for a road that has no road markings, such as lane markers. As a result, during target detection by image recognition, erroneous detections and detection omissions attributed to inaccurate understanding of the road surface shape can be reduced.

(ii) According to the present embodiment, information required for target detection is used to estimate the road surface shape. Special information used only for determining the road surface shape is not required to be separately acquired. Therefore, the amount of calculation required to estimate the road surface shape can be reduced.

(iii) According to the present embodiment, a candidate target of which the distance from the road surface is greater than an allowable distance set in advance is deleted as an erroneous detection, using the estimation result of the road surface shape. Therefore, reliability of the detected target can be enhanced.

(iv) According to the present embodiment, the estimation result of the road surface shape is used to set the search area for a target in the selected image. Therefore, even when the road surface is tilted, a suitable search area can be set. Erroneous detections and detection omissions can be further reduced.

(v) According to the present embodiment, when a lower-limit number of candidate known targets or more is detected, estimation of the road surface shape is performed. Therefore, estimation of road surface shape having low accuracy can be prevented.

Other Embodiments

An embodiment of the present invention is described above. However, the present invention is not limited to the above-described embodiment. Various embodiments are possible.

(i) According to the above-described embodiment, a plurality of types of known targets are used. However, for example, only a vehicle having a relatively large size and is easily detected may be used as the known target. Alternatively, only a target present in a state of contact with the road surface may be used as the known target.

(ii) According to the above-described embodiment, linear regression is used as a method for estimating the road surface shape. In linear regression, the road surface is considered to be a plane. However, nonlinear regression (such as kernel ridge regression) may be used. In nonlinear regression, the road surface is considered to be a curved surface. When the search area is set using a road surface estimated in this way, the search area may be set such as to be tilted accordingly based on the shape of the road surface in the selected images IM1 to IM3 of the pyramid images, as shown in FIG. 7.

(iii) According to the above-described embodiment, when the road surface shape is estimated, a cross slope of the ground surface (gradient in the X-axis direction in FIG. 6B) is taken into consideration. However, an approximate estimation that excludes the cross slope may be performed. In this instance, the plane to be estimated (the plane indicating the road surface shape) is expressed by the following expression (4) rather than the above expression (2).

$$z = a + cy \quad (4)$$

In other words, a parameter to be calculated can be reduced. Therefore, the amount of calculation can be reduced.

Furthermore, under an assumption that the point at which the camera is present is a point of origin of the coordinates, and the plane indicating the road surface shape passes through the point of origin (the camera is in contact with the ground surface), the plane to be estimated is expressed by the following expression (5).

$$z = cy \quad (5)$$

As a result, a parameter to be calculated can be further reduced. Moreover, in this instance, the parameter c to be calculated can be easily determined by the following expression (6).

$$c = \frac{\sum_i y_i z_i}{\sum_i y_i^2} \quad (6)$$

Therefore, the amount of calculation can be significantly reduced.

However, in this instance, the plane expressed by the above expression (5) using the parameter c determined by the above expression (6) that has been shifted downward (in the z-axis direction) by an amount amounting to the height of the camera from the ground surface becomes the plane indicating the road surface shape.

(iv) The constituent elements of the present invention are conceptual and are not limited to the above-described embodiment. For example, a function provided by a single constituent element may be distributed to a plurality of constituent elements. Alternatively, functions provided by a plurality of constituent elements may be integrated in a single constituent element. At least a part of the configuration according to the above-described embodiment may be replaced by a known configuration having similar functions. Moreover, at least a part of the configuration according to the above-described embodiment may, for example, be added to or replace, the configurations in the other embodiments described above.

What is claimed is:

1. A road surface shape estimating device, comprising:
a target detecting unit that detects a known target from a captured image capturing an area ahead of a vehicle, the known target being a three-dimensional target of which a size and positional relationship to a road surface is known;
a coordinate calculating unit that determines three-dimensional coordinates for each known target from a size and position in the captured image of the known target detected by the target detecting unit; and
an estimating unit that estimates a road surface shape using the three-dimensional coordinates calculated by the coordinate calculating unit.

2. The road surface shape estimating device according to claim 1, further comprising:
a deleting unit that deletes a known target from a detection result of the known target detected by the target detecting unit, the known target having a distance from a road surface which is obtained from an estimation result of the road surface shape estimated by the estimating unit exceeds a predetermined allowable distance.

3. The road surface shape estimating device according to claim 2, further comprising:
a search area setting unit that sets a search area which allows the target detecting unit to search the known target in the captured image based on an estimation result of the road surface shape estimated by the estimating unit.

4. The road surface shape estimating device according to claim 3, wherein
the estimating unit is configured to estimate the road surface shape when the number of known targets detected by the target detecting unit is greater than or equal to a predetermined lower limit.

5. The road surface shape estimating device according to claim 4, wherein
the estimating unit is configured to estimate the road surface shape by using a method of linear regression or nonlinear regression.

6. The road surface shape estimating device according to claim 5, wherein
the estimating unit is configured to estimate the road surface shape by using a method of an approximate estimation that excludes a cross slope of the road surface shape.

7. The road surface shape estimating device according to claim 6, wherein
the estimating unit is configured to estimate the road surface shape by assuming that a point at which a camera capturing an area ahead of the vehicle to produce the captured image is present is a point of origin of the three-dimensional coordinates, and a plane indicating the road surface shape passes through the point of origin.

8. The road surface shape estimating device according to claim 1, further comprising:
a search area setting unit that sets a search area which allows the target detecting unit to search the known target in the captured image based on an estimation result of the road surface shape estimated by the estimating unit.

9. The road surface shape estimating device according to claim 1, wherein
the estimating unit is configured to estimate the road surface shape when the number of known targets detected by the target detecting unit is greater than or equal to a predetermined lower limit.

10. The road surface shape estimating device according to claim 1, wherein
the estimating unit is configured to estimate the road surface shape by using a method of linear regression or nonlinear regression.

11. The road surface shape estimating device according to claim 1, wherein
the estimating unit is configured to estimate the road surface shape by using a method of an approximate estimation that excludes a cross slope of the road surface shape.

12. The road surface shape estimating device according to claim 1, wherein
the estimating unit is configured to estimate the road surface shape by assuming that a point at which a camera capturing an area ahead of the vehicle to produce the captured image is present is a point of origin of the three-dimensional coordinates, and a plane indicating the road surface shape passes through the point of origin.

13. A vehicle control system, comprising:
a camera that captures an area ahead of a vehicle to produce a captured image;
a target detecting section that detects a target from the captured image to produce target information related to the detected target; and
a vehicle control executing section that performs a vehicle control based on the target information,
the target detecting section including a road surface shape estimating device comprising:
a target detecting unit that detects a known target from the captured image, the known target being a three-dimensional target of which a size and positional relationship to a road surface is known;
a coordinate calculating unit that determines three-dimensional coordinates for each known target from a size and position in the captured image of the known target detected by the target detecting unit; and
an estimating unit that estimates a road surface shape using the three-dimensional coordinates calculated by the coordinate calculating unit.

14. A road surface shape estimating method, comprising:
detecting, using a target detecting unit, a known target from a captured image capturing an area ahead of a vehicle, the known target being a three-dimensional target of which a size and positional relationship to a road surface is known;
determining, at a coordinate calculating unit, three-dimensional coordinates for each known target from a size and position in the captured image of the known target detected by the target detecting unit; and
estimating, at an estimating unit, a road surface shape using the three-dimensional coordinates calculated by the coordinate calculating unit.

15. A road surface shape estimating device comprising:
a target detecting unit detecting a known target from a captured image capturing an area ahead of a vehicle, the known target being a three-dimensional target of which a size and positional relationship to a road surface is known;
a coordinate calculating unit determining three-dimensional coordinates for each known target from a size and position in the captured image of the known target detected by the target detecting unit; and
an estimating unit estimating a road surface position and a road surface shape, wherein the road surface position is estimated for each known target detected by the target detecting unit using the three-dimensional coordinates calculated by the coordinate calculating unit and the positional relationship between the known target and the road surface, and the road surface shape is estimated based on the estimated road surface position.

16. The road surface shape estimating device according to claim 15, wherein:
the known target includes a target present in a state of contact with the road surface and a target set at a prescribed height from the road surface; and
when the known target is the target set at a prescribed height from the road surface, the estimating unit estimates, as the road surface position, a position that is below a lower end of the target by an amount amounting to a predetermined height.

17. The road surface shape estimating device according to claim 15, further comprising:
a deleting unit deleting a known target from a detection result of the known target detected by the target detecting unit, the known target having a distance from a road surface that is obtained from an estimation result of the road surface shape estimated by the estimating unit exceeds a predetermined allowable distance.

18. The road surface shape estimating device according to claim 16, further comprising:
a deleting unit deleting a known target from a detection result of the known target detected by the target detecting unit, the known target having a distance from a road surface which is obtained from an estimation result of the road surface shape estimated by the estimating unit exceeds a predetermined allowable distance.

19. The road surface shape estimating device according to claim 1 wherein the target detecting unit detects the known target from the captured image based on a predetermined template.

20. The vehicle control system according to claim 13 wherein the target detecting unit detects the known target from the captured image based on a predetermined template.

* * * * *